(12) United States Patent
Foggia

(10) Patent No.: US 10,483,789 B2
(45) Date of Patent: Nov. 19, 2019

(54) METHOD, SYSTEM AND DEVICE FOR REGULATING VOLTAGE FLUCTUATIONS INDUCED BY AT LEAST ONE RENEWABLE ENERGY SOURCE

(71) Applicant: General Electric Technology GmbH, Baden (CH)

(72) Inventor: Guillaume Foggia, Castelnau-le-Lez (FR)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/561,289

(22) PCT Filed: Mar. 29, 2016

(86) PCT No.: PCT/EP2016/056778
§ 371 (c)(1),
(2) Date: Sep. 25, 2017

(87) PCT Pub. No.: WO2016/156301
PCT Pub. Date: Oct. 6, 2016

(65) Prior Publication Data
US 2018/0131224 A1  May 10, 2018

(30) Foreign Application Priority Data

Mar. 30, 2015 (FR) ...................... 15 52663

(51) Int. Cl.
*H02J 7/00* (2006.01)
*H01M 10/44* (2006.01)
(Continued)

(52) U.S. Cl.
CPC .................. *H02J 7/35* (2013.01); *H02J 3/24* (2013.01); *H02J 3/28* (2013.01); *H02J 7/24* (2013.01);
(Continued)

(58) Field of Classification Search
USPC .......... 320/101, 166; 307/109, 110; 363/17; 310/339
See application file for complete search history.

(56) References Cited

U.S. PATENT DOCUMENTS

| | | | |
|---|---|---|---|
| 7,081,693 B2 * | 7/2006 | Hamel | B60C 23/0411 307/151 |
| 8,928,304 B2 * | 1/2015 | Shimura | H01L 31/02021 323/299 |

(Continued)

FOREIGN PATENT DOCUMENTS

| | | |
|---|---|---|
| EP | 1 990 891 A1 | 11/2008 |
| EP | 2 772 983 A1 | 9/2014 |
| FR | 2 996 032 A1 | 3/2014 |

OTHER PUBLICATIONS

Search Report issued in French Patent Application No. 1552663 dated Mar. 8, 2016.

(Continued)

*Primary Examiner* — Yalkew Fantu
(74) *Attorney, Agent, or Firm* — Fitch Even Tabin & Flannery LLP

(57) ABSTRACT

The invention relates to a method of regulating voltage in an energy distribution network to which there are connected both a renewable energy generation system and an energy storage unit (11), the method being characterized in that, over a time window, a charging power of the electrical energy storage unit (11) is controlled so as to compensate for variations in the instantaneous voltage level induced by the renewable energy generation system relative to a prediction of the mean voltage level induced by the renewable energy generation system over the time window.

10 Claims, 2 Drawing Sheets

(51) Int. Cl.
    *H01M 10/46*     (2006.01)
    *H02J 7/35*     (2006.01)
    *H02S 50/00*     (2014.01)
    *H02J 3/24*     (2006.01)
    *H02J 3/28*     (2006.01)
    *H02S 40/30*     (2014.01)
    *H02J 7/24*     (2006.01)

(52) U.S. Cl.
    CPC .............. *H02S 40/30* (2014.12); *H02S 50/00* (2013.01); *Y02E 70/30* (2013.01)

(56) References Cited

U.S. PATENT DOCUMENTS

| | | | |
|---|---|---|---|
| 8,952,569 B2* | 2/2015 | Yun | G05F 1/67 307/86 |
| 2003/0117822 A1* | 6/2003 | Stamenic | H02J 7/35 363/132 |
| 2011/0133688 A1* | 6/2011 | Ishibashi | B60L 11/1809 320/101 |
| 2015/0130396 A1* | 5/2015 | Sells | H02J 7/35 320/101 |

OTHER PUBLICATIONS

International Search Report issued in Patent Application No. PCT/EP2016/056778 dated Jun. 3, 2016.
Written Opinion issued in Patent Application No. PCT/EP2016/056778 dated Jun. 3, 2016.

\* cited by examiner

METHOD, SYSTEM AND DEVICE FOR REGULATING VOLTAGE FLUCTUATIONS INDUCED BY AT LEAST ONE RENEWABLE ENERGY SOURCE

TECHNICAL FIELD

The field of the invention is that of energy distribution networks having renewable energy sources connected thereto. The invention aims more particularly to reduce the effect of fluctuations in voltage level caused by fluctuations in power injections from such renewable energy sources.

STATE OF THE PRIOR ART

The decentralized production of electrical power has a direct impact on the quality of power supply, in particular at distribution level.

Thus, the presence of distributed sources of energy generation in an energy distribution network generally leads to an increase in the amplitude of the voltage. With intermittent and variable energy sources such as renewable energy sources (solar, wind), variations in voltage become greater, more sudden, and more frequent (oscillations).

In many countries, limits or expected values are set concerning the amplitude and the frequency of occurrence of sudden changes in voltage.

However, due to the high variability of the renewable energy that is available (e.g. a transitory effect due to a cloud passing over a photovoltaic installation), production from a renewable energy source fluctuates quickly and frequently, leading to problems of supply quality and even of voltage stability.

As a result, it appears difficult for the operators of energy distribution systems to ensure that the limits or expected values stipulated by local standards are not exceeded as a result of the sudden changes in voltage and short-term overvoltages.

A solution therefore needs to be developed so that the penetration of renewable energy sources can be increased, while nevertheless complying with the operating limits that apply to energy distribution systems.

SUMMARY OF THE INVENTION

The invention comes within this approach and aims to limit the effect of sudden fluctuations in voltage caused by the renewable energy sources, such as for example, photovoltaic energy sources during a cloudy period.

With this aim in mind, the invention proposes a method of regulating voltage in an energy distribution network to which are connected both a renewable energy generation system and an electrical energy storage unit, the method being characterized in that, over a time window, a charging power of the energy storage unit is controlled so as to compensate for variations in the instantaneous voltage level induced by the renewable energy generation system relative to a prediction of the mean voltage level induced by the renewable energy generation system over said time window.

Certain preferred but non-limiting aspects of the system are as follows:

- the renewable energy generation system induces an instantaneous voltage level that is a function of an instantaneous operating parameter, and the electrical energy storage unit has a power reserve that is controlled in such a manner that a charging power setpoint is increased when the instantaneous operating parameter is greater than a mean operating parameter over the time window, and the charging power setpoint is reduced when the instantaneous operating parameter is lower than the mean operating parameter over the time window;
- the charging power setpoint for the power reserve of the electrical energy storage unit is modified linearly as a function of the instantaneous operating parameter;
- the power reserve is controlled in such a manner that, over the time window, the variation of the charge level of the energy storage unit corresponds to an expected variation when, over the time window, the mean of the instantaneous voltage level induced by the renewable energy generation system corresponds to the predicted mean voltage level;
- the charging power setpoint of the power reserve is controlled linearly as a function of the instantaneous operating parameter over a range of operating parameters that extend from a lower operating parameter to an upper operating parameter and within which the mean operating parameter is found;
- the method comprises a prior step of reserving the power reserve of the electrical energy storage unit in an operating plan for the electrical energy storage unit;
- the renewable energy system is a photovoltaic energy generation system, the operating parameter corresponds to insolation, the average voltage level is induced by average insolation over the time window and the instantaneous voltage level is induced by instantaneous insolation; and
- the method includes a prediction of the mean insolation for the time window and a measurement of the instantaneous insolation.

The invention also provides a control device for controlling an energy storage unit designed to be connected to an energy distribution network to which is connected a renewable energy generation system that induces an instantaneous voltage level that is a function of an instantaneous operating parameter, the device being characterized in that it comprises a unit for measuring the instantaneous operating parameter and a control unit for controlling a charging power of the energy storage unit configured to receive the instantaneous operating parameter measurement and a prediction of the mean operating parameter over a time window and to act, over said time window, as a function of the difference between the measured instantaneous operating parameter and the predicted mean operating parameter, to compensate for variations in the instantaneous voltage level induced by the renewable energy generation system relative to a mean voltage level corresponding to the predicted mean operating parameter.

The invention extends to a system for regulating voltage in an energy distribution network to which are connected both at least one renewable energy generation system and at least one electrical energy storage unit, the system comprising at least one control device of the invention for controlling the at least one energy storage unit, and a central supervisor device comprising a unit for determining control parameters for the at least one control device, said control parameters comprising the predicted mean operating parameter and a rule for correcting the charging power setpoint for the energy storage unit as a function of the difference between the measured instantaneous operating parameter and the predicted mean operating parameter.

BRIEF DESCRIPTION OF THE DRAWINGS

Other aspects, objects, advantages, and characteristics of the invention appear better on reading the detailed description given below of preferred embodiments, given by way of non-limiting example, and made with reference to the accompanying drawings, in which.

DETAILED DESCRIPTION OF PARTICULAR EMBODIMENTS

The invention relates to a method and to a system for regulating voltage in an energy distribution network having connected thereto at least one system for generating renewable energy and at least one electrical energy storage unit.

Regulation is carried out at a node of the energy distribution network, e.g. at one or more pilot node(s) representative of the voltage of a geographical area, typically the node(s) that is/are most likely to be subjected to departures from limit values or to fluctuations due to the intermittency of at least one system for generating renewable energy.

The energy storage units are connected on a common feed line, remote from the systems for generating renewable energy that generate the disturbances. The node(s) for connecting the systems for generating renewable energy (creating the disturbances), the node(s) for connecting the energy storage units (attenuating the disturbances), and the node(s) having voltage on which the regulation acts (where disturbances have the most impact, referred to as "pilot nodes" below) may all be different and may be positioned in various locations along the same outgoing line.

Figure 1:
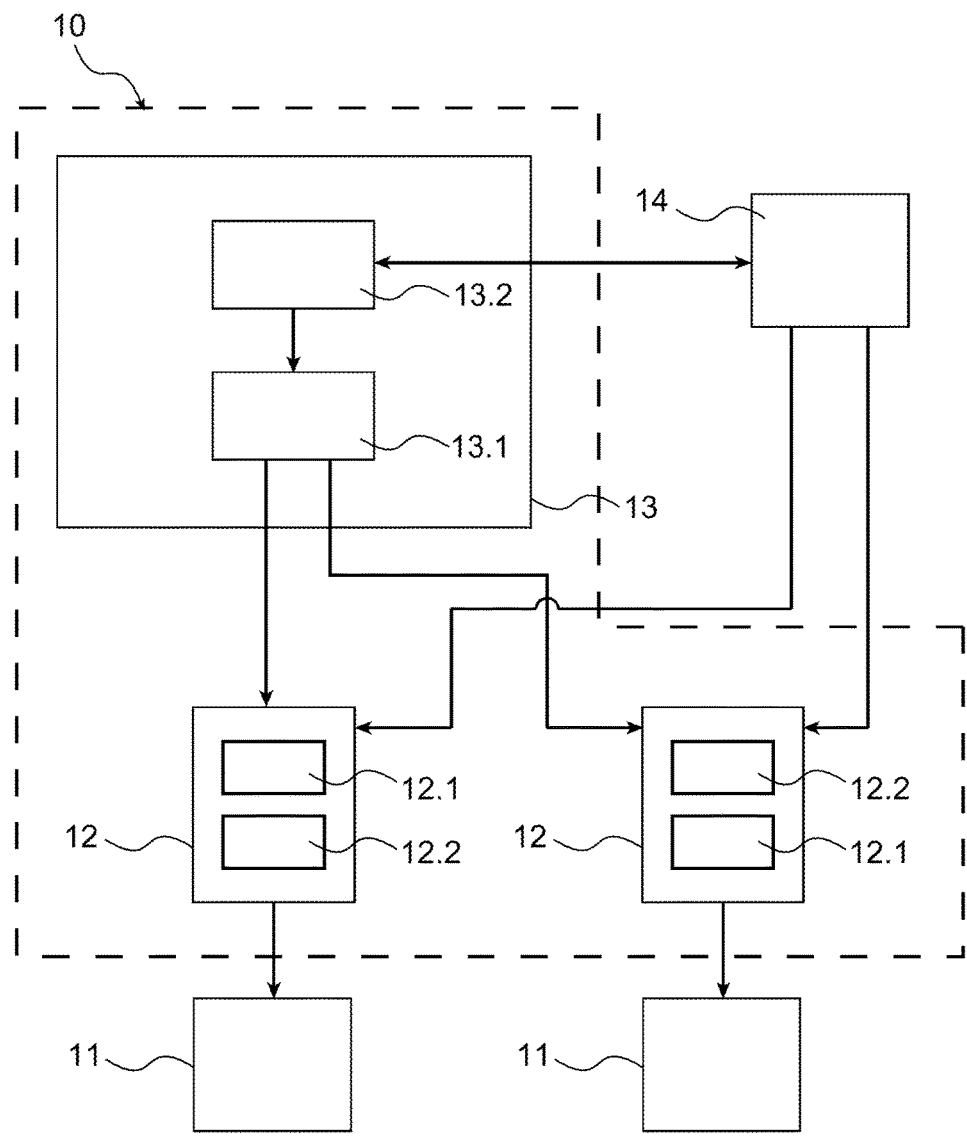
FIG. 1 is a diagram showing one possible embodiment of a system of the invention for regulating voltage in an energy distribution network.

The invention also relates to a device for controlling an electrical energy storage unit for implementing the regulation method. With reference to FIG. 1, the regulation system 10 thus includes a central supervisor device 13 with which one or more control devices 12 of an electrical energy storage unit 11 are associated.

An energy storage unit 11 typically includes one or more battery modules in series and/or in parallel and one or more inverters performing DC/AC conversion. A control device 12 for controlling an energy storage unit includes in particular a control unit 12-1 for controlling the charging power of the energy storage unit 11 that is suitable for modifying active power setpoints (for charging or for discharging) that are applied to the energy storage unit 11 in order to perform the voltage regulation of the invention.

The energy storage unit 11 is operated by a battery operator who need not be the operator of the energy distribution network to which the unit is connected. Within the more general ambit of the invention, a plurality of energy storage units 11 are connected to the network and may be operated by different battery operators.

As shown in FIG. 1, a battery operator has a management module 14 that makes it possible to define an operating plan for an energy storage unit 11, i.e. planning charging or discharging sequences, e.g. for reasons of leveling peak demand and or of load shedding. The management module 14 thus provides the active power setpoints (for charging and for discharging) to the energy storage unit 11, more particularly to its inverter(s). Within the ambit of the invention, these power setpoints are routed to the control device 12 of the energy storage unit for application of a correction term.

The renewable energy generation system induces an instantaneous voltage level on the energy distribution network, which is a function of the instantaneous power that it injects into the network. This injected instantaneous power is a function of a parameter representative of instantaneous operating conditions of the renewable energy generation system, referred to below as the instantaneous operation parameter. More particularly, for the instantaneous operating parameter, it is possible to use a parameter such that the instantaneous injected power varies linearly as a function of said parameter.

By way of example, the description below relates to a system for generating photovoltaic energy that induces a level of instantaneous voltage that is a function of an instantaneous operation parameter that corresponds to the instantaneous insolation (solar irradiance, in watts per square meter (W/m 2)). However, the invention is not limited to this example, but extends to other types of renewable energy systems, such as for example, a wind power system for which the operation parameter corresponds to the wind power cubed.

Figure 2:
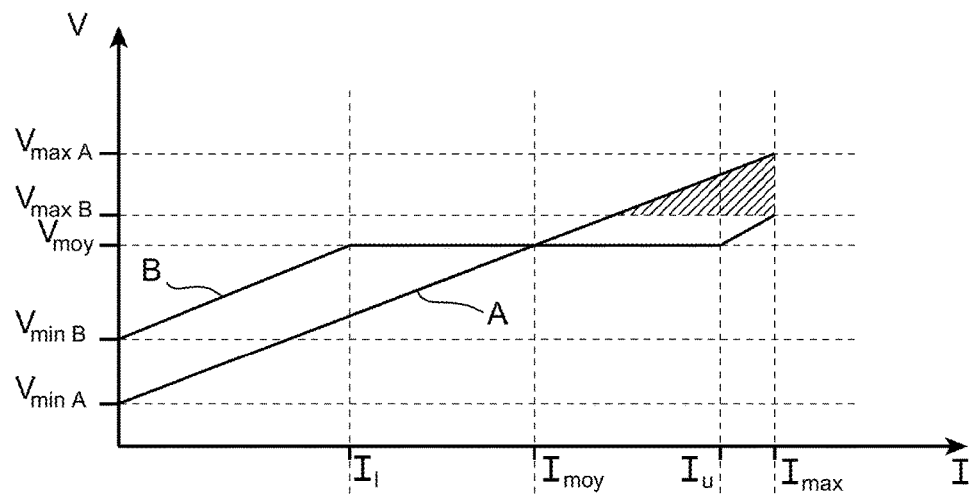
FIG. 2 is a diagram showing the voltage level on a node of the energy distribution network respectively in the absence of and in the presence of the regulation according to the invention.

Connecting one or more photovoltaic energy generation systems to the same network induces a voltage level V on a pilot node of the energy distribution network that varies as a function of the instantaneous insolation I, as plotted in curve A of FIG. 2. This instantaneous insolation I is limited by a maximum insolation Imax that may be a result of weather forecasts, or that may correspond to a maximum voltage level that can be reached at the pilot node as a result of an injection of power from the photovoltaic energy generation systems, or that may correspond to a maximum voltage level at the pilot node that is acceptable with regards to the operating standards of the distribution network. The voltage level reached at the pilot node thus varies linearly between VminA and VmaxA as a function of insolation I because of the power injections from the photovoltaic energy generation system(s).

In order to protect against sudden fluctuations and in order to avoid exceeding the high voltage limit, some minimum correction to the charging power setpoint for the battery may be imposed, so that the voltage level reached is then limited to a maximum level Vu that corresponds to an upper limit of insolation Iu.

The method of the invention makes use of a prediction of a mean voltage level Vmean reached at the pilot node as a result of the power injections made by the photovoltaic energy generation systems during a future time window. This mean level Vmean corresponds to a prediction of a mean power provided by the renewable energy generation systems over a time range under consideration in the time window. By way of example, this mean voltage corresponds to a mean insolation Imean resulting from a weather forecast for a time window, e.g. for the next ½ hour.

The method of the invention includes a real-time correction step, implemented by the control unit 12-1 for controlling the charging power of the energy storage unit 11, of correcting in real time the power setpoint for the energy storage unit 11 over said time window. This correction is performed in such a manner as to compensate for variations of the instantaneous voltage level, relative to the predicted mean voltage level Vmean, because of the fluctuations of the power injections from the renewable energy generation systems. In this way, over the time window, the voltage at the pilot node presents a voltage level that is constant and that corresponds to the predicted mean level Vmean, and this is ensured despite fluctuations in the power injections from the renewable energy generation systems, which without this correction would generate sudden variations in the instantaneous voltage level V at the pilot node.

In this respect, the curve B shown FIG. 2 shows that, after correction, the voltage level of the pilot node remains constant at the predicted mean level Vmean over a range of insolations between a lower bound Il and an upper bound Iu around the mean insolation Imean. The lower bound Il may in particular be determined by symmetry of the upper bound relative to the mean insolation Imean. In particular, the upper bound Il may be determined by linear extrapolation of the voltage limit at the pilot node.

In addition, it can be observed that the voltage at the pilot node may fluctuate over the range VminB to VmaxB that can be seen to be smaller than the range of fluctuations VminA to VmaxA in the absence of regulation. In particular, the shaded zone in FIG. 2 shows high voltage levels at the pilot node that the invention makes it possible to avoid reaching.

In one possible embodiment of the invention, it is a power reserve of amplitude $\Delta P$ of the electrical energy storage unit that is controlled in such a manner as to implement the regulation of the invention by increasing the charging power setpoint when the instantaneous operating parameter (insolation in the example) is greater than the mean operation parameter predicted for the time window, and by decreasing the charging power setpoint when the instantaneous operating parameter is less than the predicted mean operating parameter for the time window.

This power reserve typically represents a portion of the storage capacities of the energy storage unit that cannot be used for implementing other services of the operating plan of the unit. This reserve may be the subject of a prior transaction with the battery operator, the method thus including a prior step of reserving the power reserve of the electrical energy storage unit in an operating plan for the electrical energy storage unit. This prior step may be implemented by a planning and reservation unit 13-2 of the central control device. The power reserve may be constant over a period of time, or it may be defined for each time interval.

Figure 3:
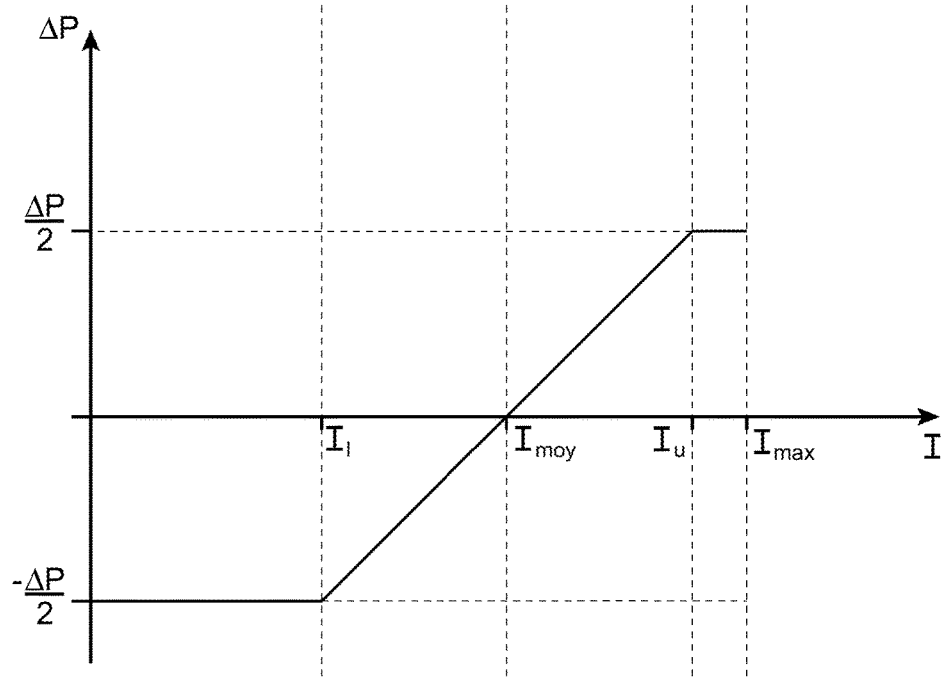
FIG. 3 is a diagram showing an example of the correction made by the invention to the charging power setpoint for a power reserve of an energy storage unit.

Looking again at the example of a photovoltaic system, and as shown in FIG. 3, the charging power setpoint for the energy reserve of the electrical energy storage unit 11 may be varied linearly as a function of the instantaneous insolation I over the range Il-Iu. Also as shown, outside said range, the setpoint may also be caused to present a minimum constant value when the instantaneous insolation I is less than the lower bound Il or to present a maximum constant value when the instantaneous insolation I is greater than the upper bound Iu.

In a preferred embodiment, said linear control is performed in such a manner that the charging power setpoint for the energy reserve is not modified, on average over the time window, whenever the instantaneous insolation, averaged over the time window, corresponds to the predicted mean insolation Imean. Control is thus centered on the operating plan provided by the battery operator 14, so that there is no deviation from the expected state of the charge level of the storage unit when the power injections from the renewable energy generation system(s) conform to the mean insolation prediction.

In other words, the power reserve is controlled in such a manner that the variation over the time window in the charge level of the energy storage unit corresponds to a expected variation when the mean over the time window of the real power injected by the renewable energy generation system (and inducing said instantaneous voltage level) corresponds to the prediction for the mean power injected over the time window (and inducing the predicted mean voltage level).

In this preferred embodiment, the correction term for the charging power setpoint for the energy reserve thus varies from $-\Delta P/2$ to $\Delta P/2$ over the range Il-Iu, is zero for a level of insolation corresponding to the mean insolation Imean, and is constant at $-\Delta P/2$ for insolation values that are less than the lower bound Il or is constant at $\Delta P/2$ for insolation values that are greater than the upper bound Iu.

The control device 12 of the electrical energy storage unit 11 further comprises a unit 12-2 for acquiring measurements of the instantaneous operating parameter, such as for example measurements of the instantaneous power of solar radiation I. The control unit 12 for controlling the charging power setpoint for the energy storage unit is then used, with the control parameters for application to the time window, namely: Iu, Il, Imean, $\Delta P$, and the setpoint P, so that over said time window and as a function of the difference between the measured instantaneous operating parameter I and the predicted mean operating parameter Imean, compensation is provided for any variations in the instantaneous voltage level as induced by the renewable energy generation system relative to the mean voltage Vmean corresponding to the predicted mean operating parameter.

As shown in FIG. 1, the prediction for the mean operating parameter Imean in a future time window is used by a unit for determining control parameters 13-1 for the central supervisor device 13. The control parameters comprise the predicted mean operating parameter and a rule for correcting the charging power setpoint for the energy storage unit as a function of the difference between the measured instantaneous operating parameter and the predicted mean operating parameter. In the preferred embodiment, this rule applies a linear correction centered on a zero correction when the measured instantaneous operating parameter corresponds to the predicted mean operating parameter.

The unit 13-1 may also be in charge of determining the lower and upper bounds Il, Iu of the operating parameter. These control parameters Il, Iu are based on a predicted state of the system, over a predefined range of maximum variation of the charging power variation around an initial operating point and on minimizing the expected range of variation in voltages at the pilot node(s), e.g. using the maximum voltage value or the maximum of the sudden variations.

The predicted state is the result of a prediction analysis of the network (essentially a calculation of load distribution) that requires:
   access to predictions by time interval (e.g. 30 min) of renewable energy production (or equivalent insolation), typically provided by a third-party application; and
   access to the declared programs for the flexibility resources (controllable generator, energy storage unit), provided by the unit 14 for the storage units that it operates.

The unit 13-1 may perform this prediction analysis, or it may make use of such an analysis done elsewhere. The unit 13-1 provides the control parameters Iu, Il, and Imean to the control device 12 of the energy storage unit, accompanied by the amplitude $\Delta P$ that is a part or all of the power reserve negotiated by the unit 13-2 with the management module 14. These parameters may be applied to the same time interval (e.g. 30 min) as the mean values (Vmean, Imean) of the state of the system from which the unit 13-1 has determined these parameters.

The control device 12 of the energy storage unit receives in addition the battery operating plan from the management module 14 of the battery operator, which operation is based on the technical capacity of the battery, minus the portion of power reserved for implementing the invention. The charging power setpoints, transmitted to the unit 11, and implemented by the inverter, are updated at a repetition rate (e.g. once every second) that is consistent with the duration of a transitory variation in instantaneous power (typically for the duration of a cloudy period).

In general terms, the above-described method consists of N energy storage units, M pilot nodes, and P renewable energy sources.

The voltage at a pilot node may be approximated as:

$$v_i(k) = v_{i0}(k) + \sum_{j \in \{B,S\}} s_{i,j}(k) * \Delta P_j(k)$$

with sensitivities $$s_{i,j}(k) = \frac{\partial V_i}{\partial P_j}(k),$$

and with $\Delta P_j(k)$, being the power injection from an electrical energy source of the set $\{S\}$ (that varies in proportion to insolation) or from an energy storage unit of the set $\{B\}$.

By seeking $v_i(k) = v_{i0}(k)$; the following is obtained:

$$\sum_{j \in \{S\}} s_{i,j}(k) * \Delta P_j(k) = -\sum_{j \in \{B\}} s_{i,j}(k) * \Delta P_j(k)$$

signifying that the variations due to the sources $\{S\}$ may be compensated for by variations driven by power injection from the energy storage units $\{B\}$.

The problem may thus be expressed as a set of constraints on the voltage values at certain pilot nodes (typically those that are the most affected by occurrences of overvoltages):
- constraints on the extreme values of fast voltage variations;
- constraints on the amplitude of voltage variations;
- constraints on the capacities of power supplies of the energy storage units; and
- constraint on the mean power level as predicted $\{S\}$ or as provided $\{B\}$, which in the preferred implementation corresponds to a correction term of zero.

This problem may be resolved by mixed integer linear programming (MILP) while seeking to minimize the total cost of the energy reserve activated or the total amplitude of said reserve. As a corollary, solving this problem determines the reserves that are called upon $\Delta P_j$ and the lower and upper insolation bounds Il, Iu that are used by the control device 12 associated with each energy storage unit, in particular so as to limit the proportional control to a range centered around the mean insolation.

Thus, various energy storage units may participate at the same time and in coordinated and efficient manner in regulating voltage.

It should be observed that the method of the invention may be implemented in continuous manner or not, e.g. as a function of a pre-established calendar or as a function of the reliability of weather forecasts.

What is claimed is:

1. A method comprising:
   providing a renewable energy generation system;
   providing a pilot node in an energy distribution network, wherein the pilot node is subject to departures from voltage limit values due to intermittency of operation of the renewable energy generation system;
   providing an electrical energy storage unit in the energy distribution network;
   connecting the renewable energy generation system to the pilot node, and operating the renewable energy system so as to induce an instantaneous voltage level at the pilot node and at a connection node that is in the energy distribution network and remote from the pilot node;
   receiving a prediction of a mean voltage level induced at the pilot node by the renewable energy generation system over a time window;
   controlling a charging power of the electrical energy storage unit over the time window so as to compensate for disturbances caused at the pilot node by variations in the instantaneous voltage level induced by the renewable energy generation system relative to the prediction of the mean voltage level over the time window;
   wherein the controlling is effective to maintain a voltage level at the pilot node that is constant over the time window and corresponds to the prediction of the mean voltage level despite the variations of the instantaneous voltage caused by the renewable energy generation system.

2. The method according to claim 1, wherein the renewable energy generation system induces an instantaneous voltage level that is a function of an instantaneous operating parameter, and wherein the step of controlling comprises controlling a power reserve of the electrical energy storage unit in such a manner that a charging power setpoint is increased when the instantaneous operating parameter is greater than a mean operating parameter over the time window, and the charging power setpoint is reduced when the instantaneous operating parameter is lower than the mean operating parameter over the time window.

3. The method according to claim 2, wherein the power reserve is controlled in such a manner that the charging power setpoint for the power reserve of the electrical energy storage unit is modified linearly as a function of the instantaneous operating parameter.

4. The method according to claim 3, wherein the power reserve is controlled in such a manner that, over the time window, the variation of the charge level of the energy storage unit corresponds to an expected variation when, over the time window, the mean of the instantaneous voltage level induced by the renewable energy generation system corresponds to the predicted mean voltage level.

5. The method according to claim 3, wherein the power reserve is controlled in such a manner that the charging power setpoint for the power reserve is controlled linearly as a function of the instantaneous operating parameter over a range of operating parameters that extends from a lower operating parameter to an upper operating parameter and which comprises the mean operating parameter is found.

6. The method according to claim 1, comprising a prior step of reserving a power reserve of the electrical energy storage unit in an operating plan for the electrical energy storage unit.

7. The method according to claim 2, wherein the renewable energy system is a photovoltaic energy generation system, the instantaneous operating parameter corresponds to an instantaneous insolation, the mean voltage level is induced by a mean insolation over the time window and the instantaneous voltage level is induced by the instantaneous insolation.

8. The method according to claim 7, further including a step of predicting the mean insolation for the time window and a step of measuring the instantaneous insolation.

9. A control device for controlling an energy storage unit connected at a connection node of an energy distribution network to which there is connected a renewable energy generation system that induces an instantaneous voltage level at a pilot node of the energy distribution network remote from the connection node, wherein the pilot node is subject to departures from voltage limit values due to intermittency of operation of the renewable energy generation system, said instantaneous voltage level being that is a function of an instantaneous operating parameter, the control device comprising:
- a measuring unit for measuring the instantaneous operating parameter; and
- a control unit for controlling a charging power of the energy storage unit, the control unit being configured:
    - to receive the instantaneous operating parameter measured by the measuring unit and a prediction of a mean operating parameter over a time window; and
    - to act, over said time window, as a function of the difference between the measured instantaneous operating parameter and the prediction of the mean operating parameter, so as to compensate for disturbances that may be caused at the pilot node by variations in the instantaneous voltage level relative to a mean voltage level induced at the pilot node that corresponds to the prediction of the mean operating parameter;
- wherein the controlling is effective to maintain a voltage level at the pilot node that is constant over the time window and corresponds to the prediction of the mean voltage level, wherein the constant voltage level is maintained despite the variations of the instantaneous voltage caused by the renewable energy generation system.

10. A system for regulating voltage in an energy distribution network to which there are connected at least one renewable energy generation system that induces an instantaneous voltage level at a pilot node of the energy distribution network and, at a connection node remote from the pilot node, at least one electrical energy storage unit, the system comprising:
- at least one control device according to claim 9, and
- a central supervisor device comprising a unit for determining control parameters for the at least one control device, said control parameters comprising the prediction of the mean operating parameter and a rule for correcting a charging power setpoint of the at least one energy storage unit as a function of the difference between the measured instantaneous operating parameter and the prediction of the mean operating parameter.

* * * * *